Oct. 31, 1939.  C. E. NORTON  2,178,286
PIPE JOINT CLAMP
Original Filed Sept. 3, 1938   2 Sheets-Sheet 1
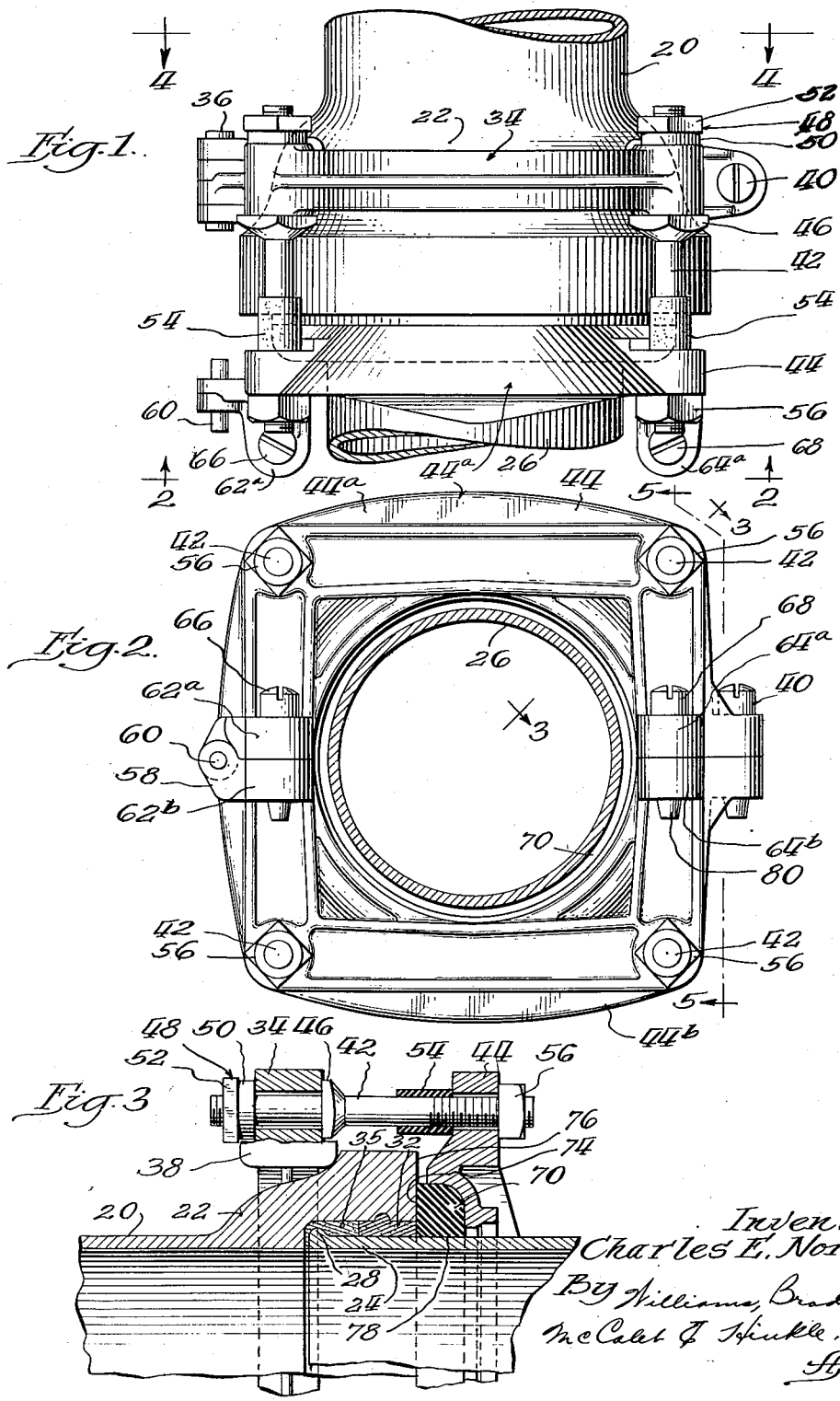
Inventor,
Charles E. Norton
By Williams, Bradbury,
McCaleb & Hinkle
Attys.

Oct. 31, 1939.  C. E. NORTON  2,178,286
PIPE JOINT CLAMP
Original Filed Sept. 3, 1938   2 Sheets-Sheet 2
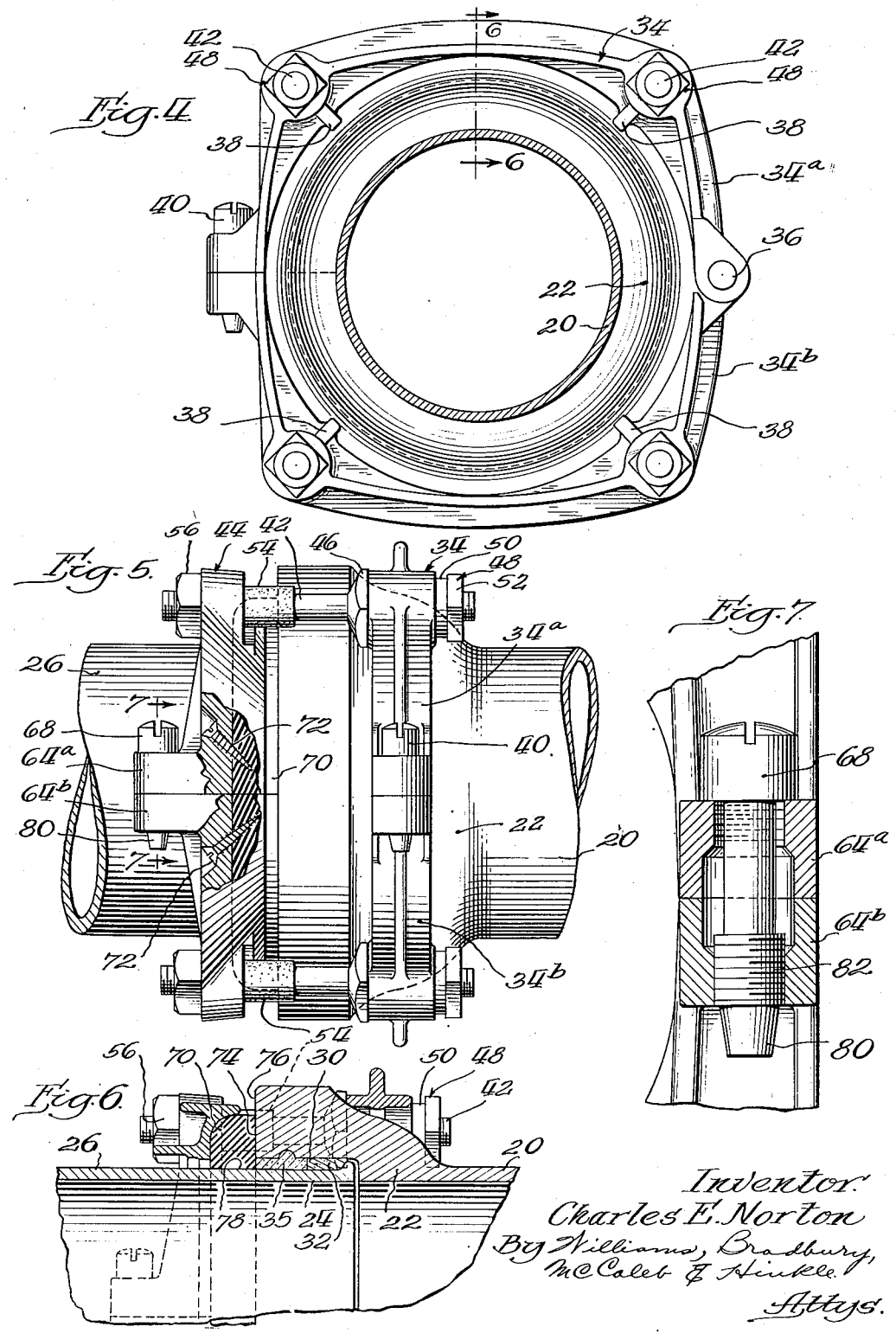
Inventor
Charles E. Norton
By Williams, Bradbury,
McCaleb & Hinkle
Attys.

Patented Oct. 31, 1939

2,178,286

UNITED STATES PATENT OFFICE 2,178,286

PIPE JOINT CLAMP

Charles E. Norton, Chicago, Ill., assignor to Norton-McMurray Manufacturing Company, Chicago, Ill., a corporation of Illinois Original application September 3, 1938, Serial No. 228,421, now Patent No. 2,163,261, dated June 20, 1939. Divided and this application April 27, 1939, Serial No. 270,337

3 Claims. (Cl. 285—194)

My invention relates to pipe joint clamps and particularly to clamps having novel structural features whereby such clamps can be applied by an improved method heretofore unknown. This application is a division of my parent application Serial No. 228,421, filed September 3, 1938, now Patent No. 2,163,261, dated June 20, 1939.

In the cities and villages throughout the United States there are thousands of miles of gas pipe having bell and spigot joints which are sealed with lead or other suitable material. As a result of ground settlement, vibration due to trucks, and other heavy vehicles, and for other miscellaneous causes, leakage of gas frequently occurs at these joints. This leakage results in loss of valuable gas, damage to vegetation adjacent the leak, and fire hazard, wherefore, it is customary for the gas companies to repair such leaks promptly.

Such repair is effected either by digging a hole in the street or pavement down to the leak so that a man or men can either reseal the leak by removing the sealing material and replacing it with new material, or by applying a pipe joint clamp in lieu of replacing the sealing material. It is more common at present to apply a pipe joint clamp for the purpose of sealing the leak than it is to replace the sealing material in the pipe joint.

In either event, it has heretofore been necessary to dig a hole in the pavement in the street or sidewalk large enough to permit a man to enter the hole and make the necessary repair. In fact, it is essential that the hole in the pavement of the street or sidewalk be somewhat larger than necessary to admit a man in order that he will have sufficient ventilation to prevent him from being overcome by the escaping gas. Even so, the repair of gas main leaks by present methods is expensive, dangerous and unhealthy.

An object of my invention is to provide a novel pipe joint clamp which can be applied through a hole in the pavement much smaller than that heretofore necessary.

Another object of my invention is to eliminate the health hazard heretofore present in making such repairs by providing a novel clamp which may be applied to the pipe by a workman standing on the pavement.

Another object of my invention is to provide an improved clamp which can be applied to underground piping more easily, quickly and cheaply than the clamps heretofore used.

Another object of my invention is to provide a clamp having novel characteristics whereby it may be applied to and secured in sealing engagement with a pipe by tools operated or controlled by men located at a distance from the pipe.

Another object of my invention is to improve the various structural features of pipe joint clamps.

Other objects and advantages will become apparent as the description proceeds.

In the drawings, Figure 1 is a plan view of a pipe joint clamp embodying my invention and showing the clamp applied to a bell and spigot joint;

Figure 2 is a view of Figure 1 looking in the direction of the arrow marked 2;

Figure 3 is a sectional view taken on the line 3—3 of Figure 2;

Figure 4 is a view similar to Figure 2 showing the other end of the clamp and is taken looking in the direction of the arrow marked 4 on Figure 1;

Figure 5 is a side elevation and is a view looking in the direction of the arrow marked 5 in Figure 2;

Figure 6 is a sectional view taken along the line 6—6 of Figure 4; and

Figure 7 is a detail view showing the cap screw and is taken along the line 7—7 of Figure 5.

Referring to the drawngs, I have illustrated therein, as best seen in Figures 3 and 6, a bell and spigot type of pipe joint wherein the pipe 20 has a bell 22 providing a socket for receiving the spigot end 24. This space is adapted to be filled by any suitable sealing means. In the particular instance, I have illustrated the seal as being effected by a yarn packing 32 and lead 35, although it is to be understood that these substances are selected for illustration only and that my invention is independent of the particular sealing material used.

Lead, cement, and the other sealing materials commonly used to seal such bell and spigot joints have little or no resiliency and where the pipe joint is subjected to vibration or strains due to other causes, the sealing material frequently cracks and leakage of gas or other fluid results.

My improved pipe clamp comprises an anchor ring 34 which comprises two sections 34a and 34b connected by a metal hinge pin 36. This anchor ring has inwardly directed projections 38 for engaging the rear of the bell 22, as most clearly shown in Figure 3. The ends of the anchor ring sections 34a and 34b which are remote from the hinge 36 are adapted to be secured together by a cap screw 40 when the clamp is secured about the pipe joint.

Each of the anchor ring half-sections 34a and 34b is provided with a pair of openings for receiving the ends of bolts 42 which connect the anchor ring with the follower ring 44. Each of the bolts 42 has an intermediate flange or head 46 which is preferably of rectangular shape to permit the application of a wrench thereto and each end of each bolt 42 is threaded as clearly indicated in the drawings. One end of each bolt 42 extends through one of the openings in the anchor ring and is secured in place by a nut 48 which is illustrated as having a cylindrical portion 50 and a rectangular or other wrench-engaging portion 52.

I have illustrated each bolt 42 as being provided with a rubber sleeve 54 which snugly fit the bolts 42 and grip the threaded portions thereof sufficiently to offer an appreciable resistance to movement of the sleeves lengthwise of the clamp. In the initial assembly of the clamp, the sleeves 54 engage the follower ring 44 and as the nuts 56 are advanced, the rubber sleeves 54 grip the threaded portions of the bolts 42 and offer sufficient resistance to advancement of the follower ring 44 to prevent backward rotation of the nuts 56 during the idle strokes of a ratchet wrench or similar tool applied thereto.

If desired, the rubber sleeves 54 may be replaced by springs as shown most clearly in Figures 1, 3 and 5 of my said parent application.

The follower ring 44 is likewise made in two sections 44a and 44b. Each section is provided with an ear 58 which are adapted to be hinged together by means of a wooden pin 60. The upper half of the follower ring 44 is provided with bosses 62a and 64a and the lower half with bosses 62b and 64b, the bosses 62a and 62b being securely clamped together by a cap screw 66 and the bosses 64a and 64b being clamped together by a cap screw 68 when the clamp is secured in place on a gas main or other pipe. The wooden pin 60 provides a frangible hinge which yields when the cap screw 66 is tightened to make possible a fluid-tight seal between the adjacent ends of a split sealing ring which I shall now describe.

A split sealing ring 70 of rubber or other suitable material has its ends attached to the follower ring 44 by screw 72 or any other suitable means. When the clamp is in place on the pipe joint, the sealing ring 70 has one face 74 engaging the face 76 of the bell on the pipe 20 and a second face 78 engaging the outer surface of an adjacent portion of the spigot end of the pipe 26, whereby a seal is effected between the two pipes which prevents leakage through the bell and spigot joint in spite of the fact that the sealing material in this joint is no longer capable of preventing such leakage.

In Figure 7 I have shown the position of the cap screw 68 when my clamp is firmly secured about a pipe joint. The cap screw has a tapered guiding end 80 and a threaded portion 82 which is shown as being engaged with the threads formed in the boss 64b. Before the clamp is positioned about the pipe joint, the cap screw 68 is positioned so that the threaded portion 82 engages the threaded portion of the boss 64a and after the clamp has been placed about the pipe, the cap screw is rotated to advance it to the position shown in Figure 7. During such advancement, the tapered portion 80 guides the cap screw into engagement with the threads of the boss 64b. The other cap screws and their associated bosses are identical with that shown in Figure 7.

When the clamp is first assembled and before it is placed around a pipe, the anchor ring 34 and the follower ring 44 are spaced far apart and the nuts 56 engage the extreme ends of the bolts 42. After the clamp has been placed about the pipe and the cap screws advanced to clamp the sections of the anchor and follower rings together, a wrench is applied to the nuts 56 to draw the follower and anchor rings together and thus force the sealing ring 70 into firm sealing engagement with the face 76 of the bell 22 and the adjacent outer portion of the cooperating pipe. The function of the sleeves 54 is to hold the follower and anchor rings in spaced relation while the clamp is placed about the pipe joint and to maintain sufficient frictional contact between the follower ring 44 and nuts 56 to prevent backward rotation of these nuts during the idle stroke of a ratchet wrench or other suitable tool.

The novel method by which my new and improved clamp may be applied to piping located below the surface of the ground is fully described and claimed in my said parent application. It will suffice here simply to state that with my novel clamp it is not necessary to dig a hole below the surface of the ground large enough for a man to descend to the pipe for the purpose of applying the clamp thereto. All that is needed is a relatively small hole whereby the clamp can be lowered to the pipe and applied thereto in sealing engagement therewith by tools manipulated by a workman or workmen standing on the surface of the ground.

While I have described my invention as particularly desirable for repairing leaks in gas mains, it is to be understood that my invention may be applied to piping used for other purposes and is not limited to the repair of gas mains. My invention is not limited to the particular form illustrated and described in detail herein, but may assume numerous other forms, of which a very few are illustrated and described in my said parent application. The appended claims are to be construed as covering the embodiment shown and all equivalents thereof.

I claim:

1. A pipe clamp of the class described, comprising a split anchor ring formed of a plurality of hinged sections, the sections having free ends being provided with bosses at said free ends, a screw secured in one boss prior to application of the clamp to a pipe and adapted to engage the threads of a complementary boss for securing the anchor ring about a pipe, a split follower ring formed of a plurality of hinged sections, the sections of said follower ring having free ends being provided with bosses at said free ends, a screw secured in one of said last-named bosses prior to application of the clamp to a pipe joint and adapted to engage the threads of a second of said last-named bosses for securing the sections of the follower ring together about a pipe, a sealing ring carried by the follower ring, and adjustable means connecting the anchor ring and follower ring and urging said sealing ring into fluid-tight engagement with a pipe surface.

2. A pipe clamp of the class described, comprising an anchor ring formed of a plurality of sections, a hinge pivotally connecting one end of each section with an end of an adjacent section, said sections having threaded bosses provided at their free ends, a cap screw having a guiding end and threads adapted to engage either of said threaded portions, a follower ring comprising a plurality of sections connected by yieldable hinge means, each section of said follower ring having a threaded boss at each end thereof, cap screws adapted to engage the threads of one boss prior to application of the clamp to a pipe joint and adapted to engage the threads of a second of said bosses for securing the sections of the follower ring together, a sealing ring carried by the follower ring, and adjustable means connecting the anchor ring and follower ring and urging said sealing ring into engagement with pipe ends.

3. In a pipe clamp of the class described, the combination of a pair of hinged sectional metal rings, a sealing ring carried by one of said metal rings and urged into pipe engaging relationship thereby, threaded bolts for connecting said metal rings, nuts movable on said bolts to vary the relative positions of said rings, and means to maintain the sectional rings in spaced-apart relation prior to assembling around a pipe joint comprising rubber sleeves closely engaging about said bolts and impinging against one of said rings.

CHARLES E. NORTON.